Jan. 26, 1960 J. M. HEUER 2,922,608
CAKE COOLING SUPPORT FOR INVERTED CAKE PAN
Filed Jan. 3, 1958
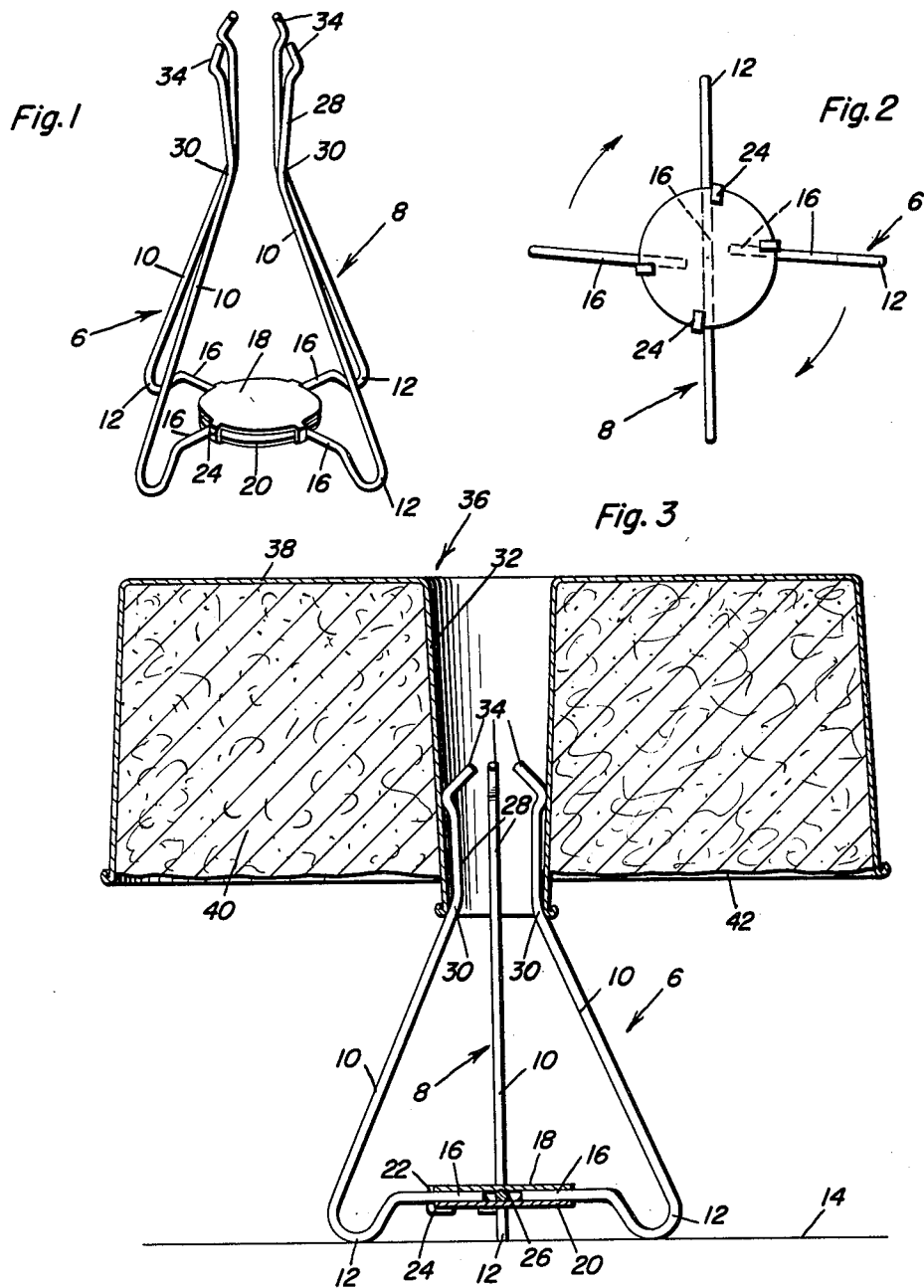
John M. Heuer
INVENTOR.

United States Patent Office 2,922,608
Patented Jan. 26, 1960

2,922,608
CAKE COOLING SUPPORT FOR INVERTED CAKE PAN

John M. Heuer, Torrington, Wyo.

Application January 3, 1958, Serial No. 706,998

2 Claims. (Cl. 248—167)

The present invention relates to support means, more particularly a simple mechanical stand, for a cake pan, that is, when the cake pan containing the baked cake is being supported above a table or the like for cooling.

As the preceding statement and title of the invention clearly imply inverting a cake pan containing, for example, angel food cake, is common practice. It is well known that this kind of a cake is very fragile and must be handled carefully, especially while it is hot. It is generally accepted procedure to immediately invert the cake containing pan after it has been removed from the hot oven. Many practices in the home involve suspending the hot pan directly on a funnel or a bottle or some similar makeshift pan elevating support. However, a number of patents have issued in which devices constituting support means of one type or another have constituted the novel subject matter of the patent. For example, one cake pan support and cake cooler device is shown in a Patent 2,777,308 of January 15, 1957. Other patents could be cited but need not be inasmuch as the problem and its solution in one manner or other is generally well known to housewives who go in for baking sponge cakes, ring cakes and especially angel food cakes.

It will be admittedly evident that the provision of a base with uprights, or a stand of one type or another to accommodate the truncated conical tube or hub of the pan is old. It is an object of the instant invention to structurally, functionally and otherwise improve upon the above mentioned patent and any similarly constructed and performing prior art adaptation and, in doing so, to provide a construction which will better meet with manufacturing requirements and economies of manufacturers and will, what is more important, serve the needs of retailers and users.

In carrying out the principles of the invention, a collapsible or foldable stand is provided. Briefly, the stand is characterized by pairs of diametrically opposite wire or equivalent legs. These cooperate in providing a pair of frames which are hingedly or rotatably connected by two disk-like plates forming a connecting hub at the bottom. The upper ends of the legs converge and are fashioned into members which are fitted releasably and yieldably into the tube of the pan to in this manner properly support the pan in an elevated position.

Other objects, features and advantages will become more readily apparent from the following description and the accompanying drawing.

In the drawing, wherein like numerals are employed to designate like parts throughout the views:

Fig. 1 is a perspective view of a cake pan stand constructed in accordance with the principles of the present invention, the stand appearing on a small scale.

Fig. 2 is a bottom plan view of the same showing with the aid of arrows how the frames or components of the over-all stand are adapted to be pressed or folded together for compact association.

Fig. 3 is a view in elevation with parts in section showing the stand erected and in use supporting the cake containing pan in an inverted cake-cooling position.

As before mentioned, the stand is of an openwork construction and made up primarily of suitably stout wires or rod-like stock. One frame is denoted by the numeral 6 and the other one by the numeral 8. Both frames are the same in construction. In fact, each frame is made up of a pair of outwardly and downwardly diverging legs, all of the legs being here denoted by the numeral 10. Each leg has its lower leg bent inwardly and upon itself at 12 into generally U-shaped form to provide a foot which is adapted to rest on the table or other support surface 14. The free lower end of the leg is bent in a horizontal position at 16. The four horizontally bent portions 16 are sandwiched between upper and lower disks of metal or the like, the upper disk being denoted at 18 and the lower one at 20. The upper disk is marginally provided with bendable fingers 22 which have their lower ends formed into hooks 24 which engage slidingly or rotatably over the marginal edge of the lower plate 20. Thus, the disks or plates may be said to be hooked together for relative rotation providing a satisfactory hook. The end portions or terminals 16 of the legs in the frame 6 are soldered or otherwise fixed to one plate, say, for example, the bottom plate while the corresponding portions 16 of the legs 10 of the other frame 8 which are diametrically opposite are affixed to the top plate, as shown for example at 26 in Fig. 3. Thus, the paired legs of the respective frames 6 and 8 are assembled and satisfactorily joined together. The upper portions of the legs converge and they are then fashioned into substantially perpendicular portions as at 28 and consequently define bent portions or bends 30 which in turn provide circumferentially spaced shoulders when the frames are spread apart in the usable position illustrated in the drawings. The extreme upper ends of the straight portions are directed toward each other and are sufficiently deflected to facilitate piloting the portions 28 into the truncated hollow hub or tube 32 as at 34. The tube is a common part of the stock cake baking pan 36 the bottom of which is denoted at 38. The cake is seen at 40 and the top of the cake, inverted in Fig. 3, is denoted at 42. As before pointed out, the procedure would be to take the hot cake out of the oven and turn the pan upside down and support it on the open or spread stand in the manner seen in Fig. 3. When the stand is not used the sections or frames 6 and 8 are collapsed or folded together for compactness and convenience.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. For use in elevating a cake pan of a type provided with a tubular hub and serving to assist one in cooling a cake which is still in the pan, a portable stand of a size and type that it may be conveniently positioned, when in use, on the kitchen table or elsewhere, the height of said stand being such that the cake in the pan is elevated above the level of the table, said stand embodying a pair of complemental similarly constructed leg frames having upwardly converging legs with springy upper end portions, said end portions being vertical and circumferentially spaced and adapted to be fitted telescopingly and removably into the tubular hub of the pan, the lower ends of said legs being horizontal and portions of the legs adjacent said horizontal ends embodying U-shaped bends and said bends defining foot-like rests adapted to reside on the table, and an assembling and retaining hub embodying a pair of substantially duplicate disks arranged one above the other, marginal edge portions of said disks being assembled and rotatably connected together, said horizontal lower ends being interposed and "sandwiched" between and secured to said disks in such a manner that the leg frames may be folded together and collapsed.

2. A stand comprising a hub embodying like upper and lower disks one above the other, the marginal edge portions of said disks being connected together for relative rotation, a plurality of circumferentially spaced duplicate legs having lower end portions bent laterally and connected to their respective disks and having converging portions terminating in vertical upper end portions, the extreme upper ends of said upper end portions being toed-in directed toward each other to conjointly provide piloting means to be telescopingly and removably projected into the tube portion of a cake pan, the portion of each leg between the connected lower end portion and the converging portion being fashioned into a U-shaped bent portion and said bent portion constituting a supporting foot, the bight of the bent portion, which is adapted to rest on a supporting surface, being disposed in a plane below the plane of said hub.

References Cited in the file of this patent

UNITED STATES PATENTS

| | | |
|---|---|---|
| 566,934 | Penfield | Sept. 1, 1896 |
| 1,488,991 | Lettre | Apr. 1, 1924 |
| 1,616,159 | Willenbacher | Feb. 1, 1927 |
| 1,943,269 | Holden | Jan. 9, 1934 |
| 2,504,031 | Manning | Apr. 11, 1950 |
| 2,777,308 | Roberts et al. | Jan. 15, 1957 |
| 2,791,391 | Uphoff | May 7, 1957 |